United States Patent [19]
Te

[11] Patent Number: 5,141,537
[45] Date of Patent: Aug. 25, 1992

[54] WASTE GAS-PURIFYING DEVICE

[76] Inventor: Wang Y. Te, #65, Alley 1, Lane 230, Chung-Chang Rd. Dalin, Chia-Yih, Taiwan

[21] Appl. No.: 814,650

[22] Filed: Dec. 30, 1991

[51] Int. Cl.⁵ .............................................. B01D 47/00
[52] U.S. Cl. ....................................... 55/223; 55/230; 55/256; 55/259; 55/316; 55/342; 55/406
[58] Field of Search ................. 55/223, 230, 256, 259, 55/316, 342, 406

[56] References Cited
U.S. PATENT DOCUMENTS

| | | | |
|---|---|---|---|
| 856,732 | 6/1907 | Saaler | 55/230 |
| 879,219 | 2/1908 | Towns | 55/230 |
| 4,175,933 | 11/1979 | James | 55/259 |

*Primary Examiner*—Bernard Nozick
*Attorney, Agent, or Firm*—Browdy and Neimark

[57] ABSTRACT

A waste gas-purifying device including a primary dust-collecting assembly, a first stage fan assembly, a second stage fan assembly, a filtering means and a water tank, wherein the waste gas discharged from a plant is sucked by the rotating fans and flows into the primary dust-collecting assembly to be divided into three ways of flows which respectively enter three fans of the first stage fan assembly, a shaft of the fan being hollow and formed with multiple holes with different diameters and directions whereby water vapor is injected from these holes to mix with the dust particles in the waste gas and then the water together with the dust drops down and flows into the water tank to be transferred by a rotary coil rod toward the ground surface for further processing, the waste gas being further forced into the filtering means by the pushing force of the fans and sucking force of a pump and then discharged from the filtering means and flowing into a dividing pipe which extends below the water surface of the water tank so that the waste gas is further treated and discharged in a purified state.

3 Claims, 5 Drawing Sheets

WASTE GAS-PURIFYING DEVICE

BACKGROUND OF THE INVENTION

The present invention relates to a waste gas-purifying device, wherein the waste gas discharged from a plant is sucked by the fans and flows into a primary dust-collecting assembly to be divided into three ways of flows which respectively enter three fans of a first stage fan assembly, a shaft of the fan being hollow and formed with multiple holes whereby water vapor is injected from these holes to mix with the dust particles and then the water together with the dust drops down and flows into the water tank, the waste gas being further forced through a filtering means and guided into a dividing pipe which extends below the water surface of the water tank so that the waste gas is discharged in a purified state.

conventional waste gas-filtering device disposed in a plant has several drawbacks as follows:

1. A chimney is disposed to directly discharge the waste gas which ill affects human health and destroys natural living state.

2. The amount of the waste gas is very great and the waste gas is directly guided into the filtering device so that the filtering materials are always blocked and disabled from normally functioning to filter the waste gas after several day use. Under such circumstance, the air is prevented from convecting so that the burning efficiency is poor. As a result, the filtering device must be cleaned by labor and such procedure seriously ill affects the production of the plant and increases the maintenance cost.

3. The temperature of the discharged waste gas is averagely 800° C.–1200° C. so that the filtering materials which can not stand high temperature often fail to normally function and the using life thereof is very short.

It is therefore tried by the applicant to develop a waste gas-purifying device which is simply structured and able to remove the dust, smoke and toxical particles from the waste gas to eliminate the drawbacks existing in conventional device and lower the maintenance cost.

SUMMARY OF THE INVENTION

It is a primary object of this invention to provide a waste gas-purifying device which is capable of removing the dust, smoke and toxical particles from the waste gas and minimizing the contamination of environment.

It is a further object of this invention to provide the above device wherein the waste gas discharged from the plant first goes through a dust-collecting procedure and then several times of water-washing treatment so that the temperature of the waste gas can be lowered and the using life of the filtering device can be prolonged.

It is still a further object of this invention to provide the above device wherein the water contained in the water tank will not be drained out and the loss of water due to vaporization can be supplemented by adding water to a standard level so that no second contamination of water source will take place.

It is still a further object of this invention to provide the above device which is suitable to treat great amount of waste gas discharged from a plant such as fire power plant or a combustion furnace.

It is still a further object of this invention to provide the above device in which the convection is well performed and the burning is complete and no other gas is required for assisting in burning.

The present invention can be better understood through the following description and accompanying drawings wherein:

BREIF DESCRIPTION OF THE DRAWINGS

FIG. 1 is a plane view of this invention;
FIG. 2 is a top view of this invention;
FIG. 3 is a sectional view of the primary dust-collecting assembly thereof;
FIG. 4 is a sectional view of a part of the primary dust-collecting assembly thereof;
FIG. 5 is a sectional view of the first stage fan assembly of this invention;
FIG. 6 is a sectional view of the fan, showing the water flow therein;
FIG. 7 is a structural longitudinal sectional view of the fan and the shaft thereof; and
FIG. 8 is a cross-sectional view of the fan of this invention;

DETAILED DESCRIPTION OF THE PREFERRED EMBODIMENT

Figure 1:
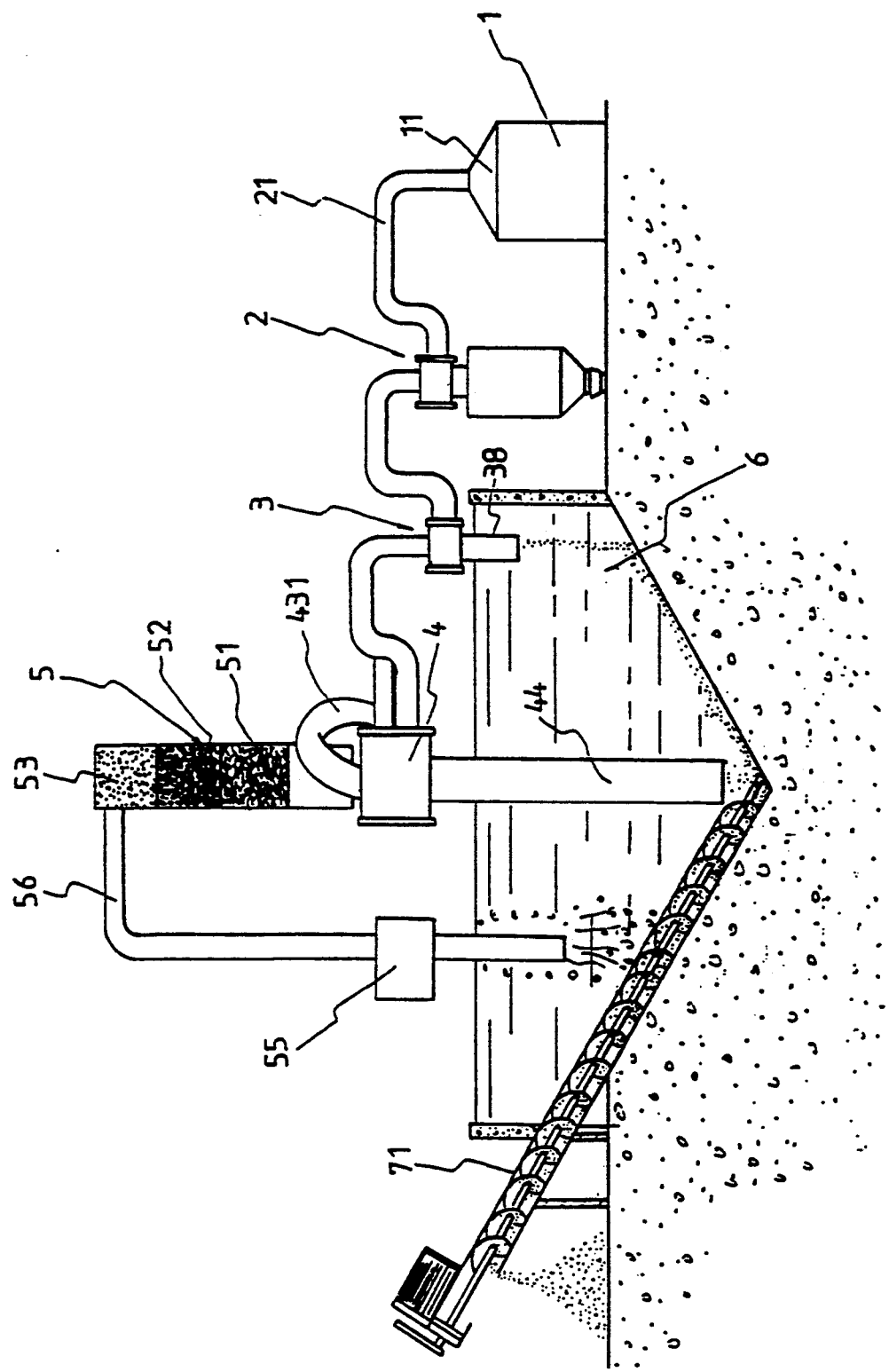
Figure 2:
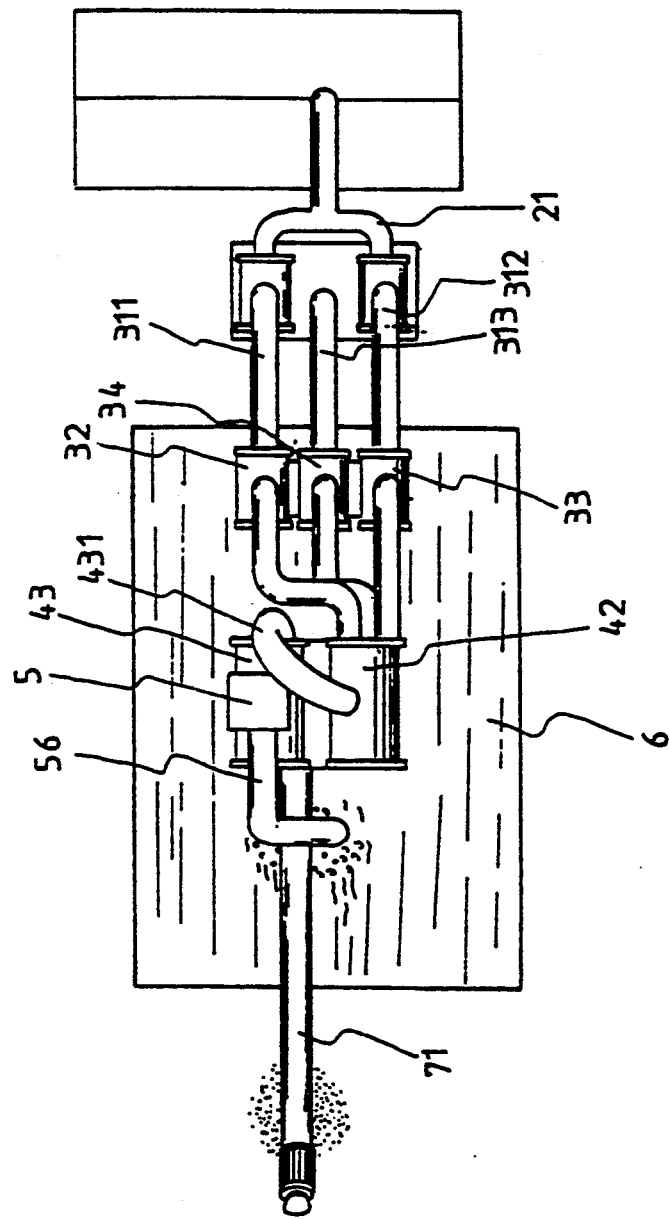
Figure 4:
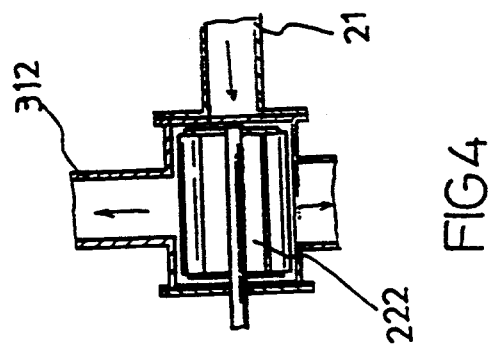
Figure 3:
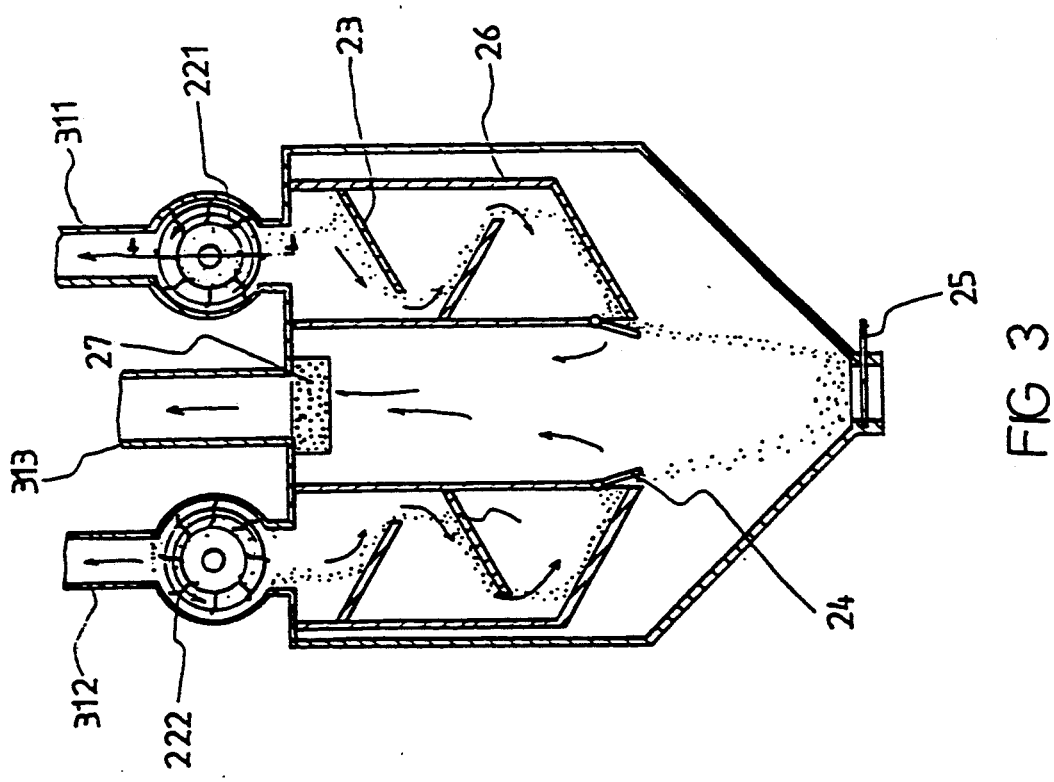

Please first refer to FIGS. 1, 2, 3 and 4. The present invention includes a primary dust-collecting assembly 2, a first stage fan assembly 3, a second stage fan assembly 4, a filtering means 5 and a water tank 6, wherein the primary dust-collecting assembly 2 is a hollow frame body with a conic lower portion having a valve 25. Two fans 221, 222 are disposed on two sides of the frame body, and forked pipes 21 are disposed at the shaft ends of the fans 221, 222 to communicate with a waste gas outlet 11. The upper ends of the fans 221, 222 are connected with two fans 32, 33 of the first stage fan assembly 3 through conduits 311, 312. The lower ends of the fans 221, 222 are disopsed with conduits 26 in which multiple interposed and angled guide boards 23 are disposed. A valve 24 is disposed at the lower end of the conduit 26. A conduit 313 is disposed at the upper end of the primary dust-collecting assembly 2 to connect with the fan 34 of the first stage fan assembly 3. A filtering network 27 is disposed at the inlet of the conduit 313.

Figure 5:
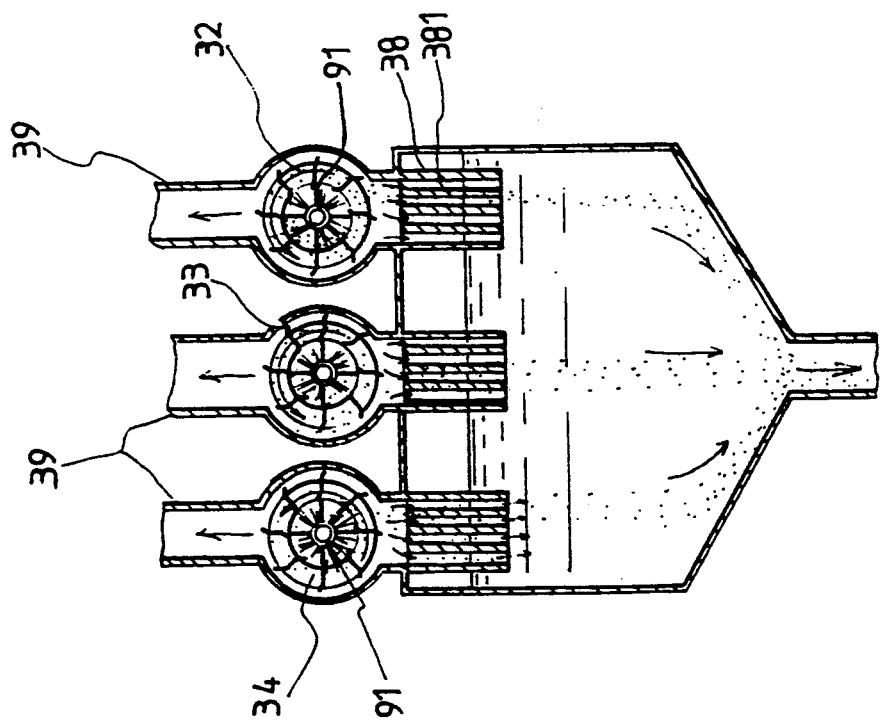
Figure 7:
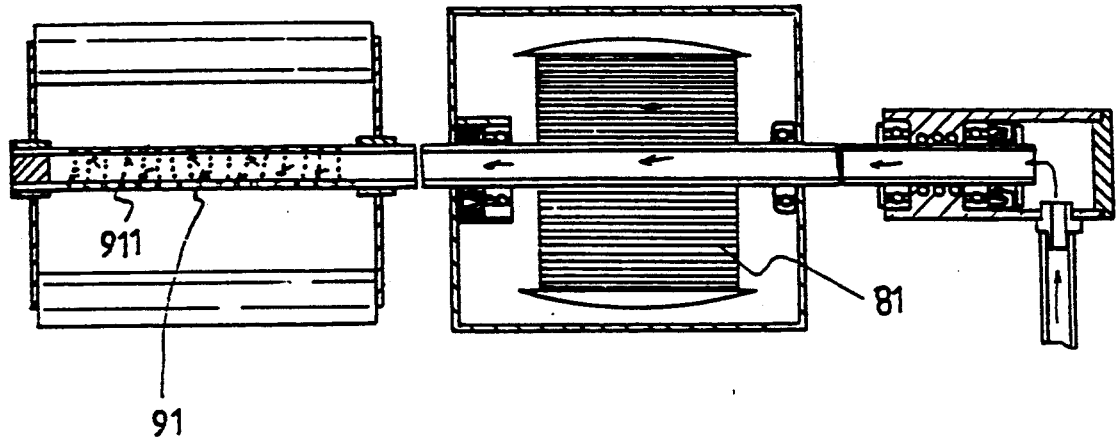
Figure 8:
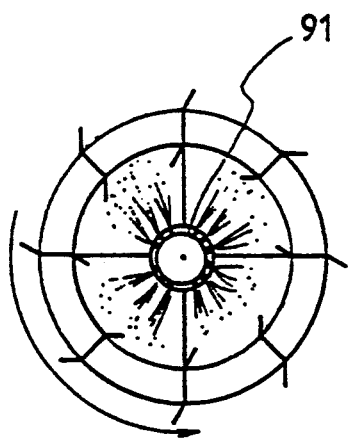

Please now refer to FIGS. 1, 2, 3, 5, 7 and 8, wherein the first stage fan assembly 3 includes three spaced fans 32, 33 and 34. The shaft 91 of each of the fans 32, 33, 34 is hollow and a motor 81 is operatively connected with the shaft. Multiple holes 911 are formed on the shaft 91. Conduits 38 are disposed at the lower ends of the fans 32, 33, 34 to communicate with the water tank 6. Multiple dividing screens 381 are disposed in the conduit 38. Combination conduits 39 connect the upper ends of the fans 32, 33, 34 with the second stage fan assembly 4.

Figure 6:
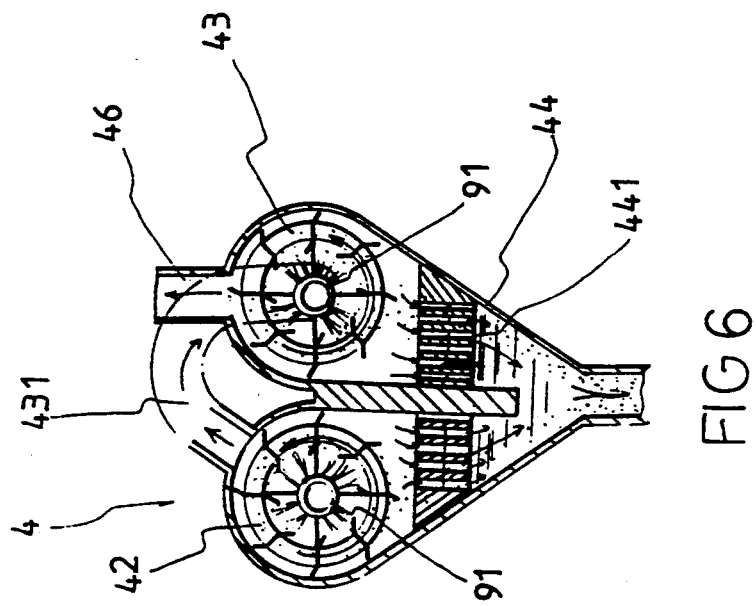

Please now refer to FIGS. 1, 2, 6, 7 and 8. The conduits 39 incorporate with one another and enter the second stage fan assembly 4. The fans 42, 43 thereof are driven by the motor 81. Similarly, multiple holes 911 with different diameters and directions are formed on the shafts 91 of the fans 42, 43. A water-collecting pipe 44 is disposed under the fans 42, 43 and extended below the water surface of the water tank 6 through dividing screens 441. A partitioning board 45 is positioned between the fans 42, 43. A conduit 46 is further disposed at the upper end of the fan 43 to communicate with the filtering means 5. The filtering means 5 is composed of raw glass fiber 51, activated carbon 52, fine glass fiber 53 and partitioning board. A ventilator 55 is mounted on the conduit 56 which has an outlet located below the water level of the water tank 6. The water tank 6 has no draining opening and a rotary coil rod 71 is disposed on the bottom of the water tank 6.

When operated, the motor 81, ventilator 55 and rotary coil rod 71 are first powered on and actuated, whereby the waste gas produced in the plant 1 is sucked by respective fan assemblies through the forked pipe 21 into the fans 221, 222 of the primary dust-collecting assembly 2. At this time, most of the waste gas flows through the conduits 311, 312 into the fans 32, 33 while minor part of the waste gas is subject to the downward force created by the counterclockwise rotation of the fans 221, 222 and flows through the interposed guide boards 23 in the conduit 26, the valve 24, the filtering network 27 and the conduit 313 toward the fan 34. In this procedure, the heavier and larger dust particles will be stopped by the guide boards 23 and slide therealong and then drop to the valve 25 or will be filtered by the filtering network 27. Moreover, the waste gas flowing through the conduits 311, 312, 313 into the fans 32, 33, 34 will be sucked and stirred by the fans 32, 33, 34 and mixed with the vaporized water injected from the holes 911 of the shaft 91. Through the above water-washing effect, most of the dust is attached to the water vapor and guided into the conduit 38 and then flows through the dividing screen 381 into the water tank 6. Moreover, after the waste gas is water-washed by the fans 32, 33, 34, the waste gas is sucked by the second stage fan assembly 4 through the combination pipe 39 into the fan 42 of the second stage fan assembly 4. Thereafter, the waste gas is sucked and stirred by the fan 42 and mixed with the water vapor injected from the holes 911 of the shaft 91. Since the holes 911 have irregular directions and diameters, the water vapor is injected in a fog pattern so as to sufficiently mix with the waste gas and perform a second water-washing operation. As a result, most of the dust particles are attached to the water vapor and flow through the dividing screen 441 of the water-collecting pipe 44 into the water tank 6 along with the water. At this time, still a minor part of the dust remains in the gas. However, the waste gas is furhter guided through the conduit 431 into the fan 43 for third water-washing operation. Therefore, the dust is almost all removed. In case the amount of waste gas discharged from the plant 1 is great, the number of the second stage fan assembly 4 can be increased. In addition, the waste gas is guided into the filtering means 5 through the conduit 46 to be filtered by the raw glass fiber 51, activated carbon 52 and fine glass fiber 53. The ventilator 55 is used to force the waste gas into the filtering means 5 and make the filtered clean gas flow into the dividing pipe 56. The dividing pipe 56 extends below the water surface of the water tank 6 so that the gas can be sucked into the water for fourth water-washing operation. Thereafter, the finally discharged gas is throughly purified and freed from contaminating particles. The number of the dividing pipes 56 can be increased depending on the amount of the discharged waste gas. The water tank 6 is disposed under the water-collecting pipe 44 with the rotary coil rod 71 located at the bottom of the water tank 6. The coil rod 71 is used to transfer the mud dropping from the water-collecting pipe 44 and conduit 38 toward the ground for further processing. The water contained in the water tank 6 will not be drained out so that no contamination of water source will take place.

When the water contained in the water tank 6 is vaporized by heat and the water level is lowered to a certain position, the tap water can be added into the water tank 6 to raise the water level to a standard position.

What is claimed is:

1. A waste gas-purifying device, comprising:

a primary dust-collecting assembly which is a hollow frame body with a conic lower portion having a valve, two fans being disposed on two sides of said frame body, forked pipes being disposed at the shaft ends of said fans to communicate with a waste gas outlet, the upper ends of said fans being connected with two fans of a first stage fan assembly through conduits, the lower ends of said fans being disposed with conduits in which multiple interposed and angled guide boards are disposed, a valve being disposed at the opening of said conduit, a conduit being disposed at the upper end of said primary dust-collecting assembly to connect with a central fan of the first stage fan assembly, a filtering network being disposed at the inlet of said conduit;

a first stage fan assembly including three spaced fans, the shaft of each of said fans being hollow, multiple holes being formed on said shaft, conduits being disposed at the lower ends of said fans to communicate with a water tank, a combination conduit connecting the upper ends of the fans with a second stage fan assembly., a second stage fan assembly including two fans spaced by a partitioning board, multiple holes being formed on the shafts of said two fans, one shaft end of one of said two fans being communicated with said combination conduit and the other end thereof being communicated with the other fan, a conduit being further extended from the other fan to communicate with a filtering means, a water-collecting pipe being disposed under said two fans;

a filtering means including raw glass fiber, activated carbon, fine glass fiber and partitioning board, the upper end of said filtering means being communicated with said fan assemblies through conduits and the other end thereof being disposed with a ventilator, multiple dividing pipes being communicated with the outlet of said ventilator; and a water tank in which a rotary coil rod is disposed under said water-collecting pipe, whereby when the waste gas flows into said primary dust-collecting assembly through said forked pipe, due to the rotary power of the fans therein, the heavier and larger dust particles will be stopped by the interposed and angled guide boards and slide therealong and then drop to the valve, while the waste gas with the lighter and smaller dust particles further flows through the conduits into said first stage fan assembly to be stirred by the fans therein and mixed with the water vapor injected from the holes of the shaft, and through this water-washing operation, most of the dust is attached to the water vapor and guided into the conduit and then flows into the water tank, and moreover, through the combination conduit, the treated waste gas is further sucked into said second stage fan assembly for second water-washing operation and then flows into the filtering means and is pushed by said ventilator to the dividing pipes for further purification and then is discharged, a funnel in the water tank collecting the mud flowing from the water-collecting pipe and the conduits of said first stage fan assembly and the rotary coil rod transferring the mud to the ground surface for further processing.

2. A device as claimed in claim 1, wherein said holes of said shaft are closely arranged with irregular directions and diameters.

3. A device as claimed in claim 1, wherein the number of said second stage fan assembly can be decided depending on the amount of the discharged waste gas.

* * * * *